No. 3,661.
REISSUED OCT. 5, 1869.
I. V. HOLMES.
METALLIC LATHING.
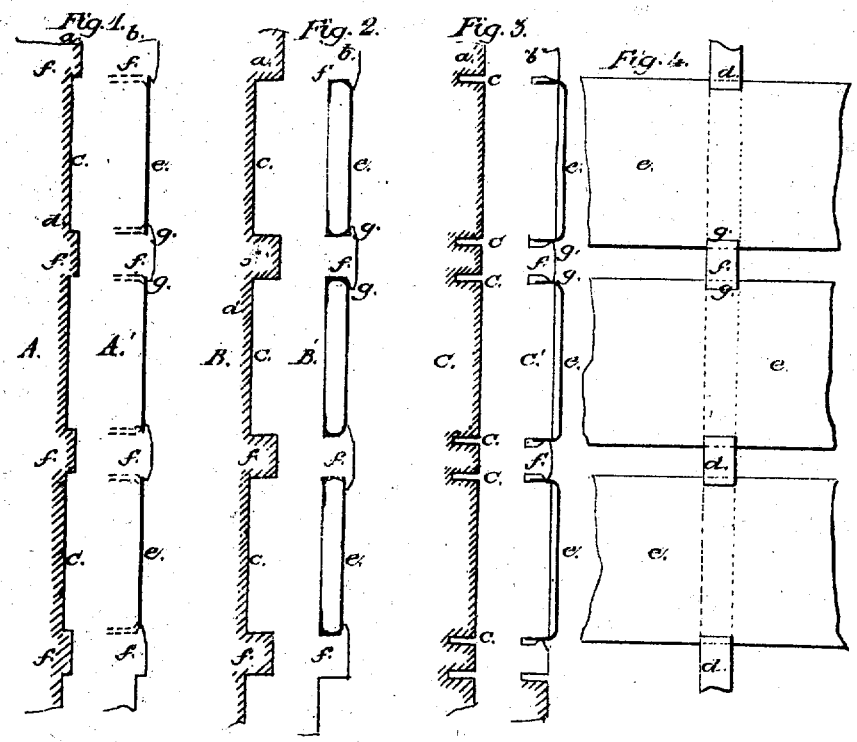
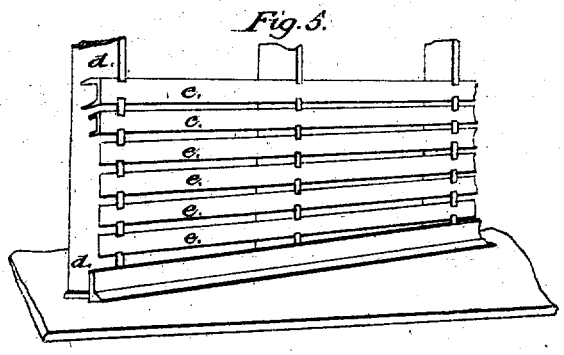
H. C. Selton } Witnesses.
Albt. Schafield
Inventor:
Isaac V. Holmes
THE NORRIS PETERS CO., PHOTO-LITHO., WASHINGTON, D. C.

UNITED STATES PATENT OFFICE.

ISAAC V. HOLMES, OF NEW YORK, N. Y.

IMPROVED METALLIC LATHING.

Specification forming part of Letters Patent No. 86,305, dated January 26, 1869; Reissue No. 3,661, dated October 5, 1869.

*To all whom it may concern:*

Be it known that I, ISAAC V. HOLMES, of New York, in the county of New York, and in the State of New York, have invented a new and Improved Metallic Stud for Fire-Proof Walls; and I do hereby declare that the following is a full and exact description thereof, reference being had to the accompanying drawings, and to the letters of reference marked thereon.

The nature of my invention consists in constructing studs or supports of iron or other suitable material, to be used in the construction of walls of houses and other like structures, in such form that metallic lath may be easily fastened to them without bolts, nails, screws, or rivets, and may, when so fastened to them, materially add to their stiffness and strength, and thus secure a saving in the material of which they are constructed.

To enable others skilled in the art to make and use my invention, I will proceed to describe its construction and operation.

I construct the studs or supports of iron or other suitable material, of such thickness and width and of such shapes as will best adapt them to the purpose of supporting the lath required for the various plaster walls used in building—such as the vertical surfaces of partitions and side walls; curved surfaces, such as cornices, moldings, and domes; horizontal or angled surfaces, such as plain or paneled ceilings—in any given case the thin or recessed edge or surface being presented to the lath or plaster, thus affording stiffness and strength to resist pressure against the face of the wall when made.

Figures 1, 2, and 3 respectively represent side views of studs for vertical walls with different forms or proportions of recesses for receiving the laths. In the use of my invention the variations in the form, shape, or proportion of the recess is made to suit the peculiar shape or form of lath to be used; and I do not confine my improvement of a recess or projections on the face of a stud to hold a lath in position to any particular form of lath. Fig. 4 is a front elevation, showing the laths and stud combined. Fig. 5 is a perspective view of the studs and laths in position.

The general form of such laths as these studs are intended to be used with is shown by the red lines and letters *e e e* in Figs. 1, 2, and 3, where end views are presented of them, showing in what form the sheet metal is bent in constructing them, while a front view of their faces when in position in the studs is shown in Fig. 4 by the letters *e e e*. The stud A, Fig. 1, has recesses for the laths cut away from it of the width of the laths and of a little greater depth than the thickness of the metal of which they are formed, and these recesses are made just as far apart as it is desired to have the laths on the stud, and a projection of the material of the stud is left between adjacent recesses. The ends of the recesses may be cut under or at an angle, so that the corners may overhang the lath, if necessary; also, the recesses may be so proportioned or spaced off that the projections may pass through a mortise or opening punched or cut in the lath. The bent-back edges of the lath, of a width equal to the thickness of the studs, are cut away and removed, so that the back of the body of the lath will fit up against the edge of the stud in the recess when the back of the lath is placed flat upon the recess, and then by the use of any suitable calking-tool the metal of the projection *f* may be beaten out and riveted upon the corners of adjacent laths, as at *g g*, and such edges or corners are thus made fast to the stud.

In the case of using a lath with an opening in the body of the same to receive the projection, then the metal forming the projection would be riveted down or expanded, so as to close up the opening, and by that means secure the lath in position. Of course when these studs are placed in position to support the wall-surfaces, these projections or recesses should be in line.

In Fig. 2, B represents a stud with the recesses of a different form or proportion. Here the variation is caused by making the recess C deeper and the projection *f* longer. The seating of the lath is in a different manner, as no part of the lath is cut away; but it is placed in the recess and forced with its edges against the back of the recess until these edges, which were formed at right angles to the face of the lath, are bent or curved into a direction parallel to the face, as shown by the red lines in B′, and bringing the face of the lath a little within the line of the projections at *f f f*. Then the metal of the projections is riveted over or the laths are expanded, as at *g g* in Fig. 1.

C in Fig. 3 represents a stud with the arrangement of recesses or slits different from the other two, as represented in Figs. 1 and 2. Here the recesses take the form of narrow slits *c c c* at proper and regular distances apart, and deep enough to receive the whole of the bent edges of the lath, and by the cutting of these slits the projections *f f f* are left to stand out between the edges of adjacent laths, and, the edges being placed within the slits or recesses, the edges of the projections are riveted over, as shown in C′, Fig. 3, at *g g*, just as the same thing was done in Figs. 1 and 2. A modification of this mode of fastening could be used by cutting the slits or recesses at an angle greater or less than a right angle to the edge of the stud, and then the lath be held in position by the bent-back edges of the lath being forced into these slits. These fastenings of the laths to the studs, thus securely made and at short and regular intervals along their whole length, greatly stiffen and strengthen the studs, and prevent their bending laterally, so that they may be made and used much lighter and thinner than they might be but for such fastening, and a saving of metal is the result. The studs are made with their ends turned over in flanges; or flange-pieces may be attached to them for the purpose of fastening them to the floor and ceiling when in position.

What I claim, and desire to secure by Letters Patent, is—

1. A metallic stud or support when formed with suitable projections and recesses or slits for holding metallic lathing, substantially as herein described and set forth.

2. The mode of fastening metallic laths of any suitable form upon metallic studs or supports, when formed with projections and recesses or slits, by riveting the corners of the projections down over the edge of the lath, substantially as described.

ISAAC V. HOLMES.

Witnesses:
ALBT. DELAFIELD,
H. C. FELTON.